Patented Sept. 27, 1927.

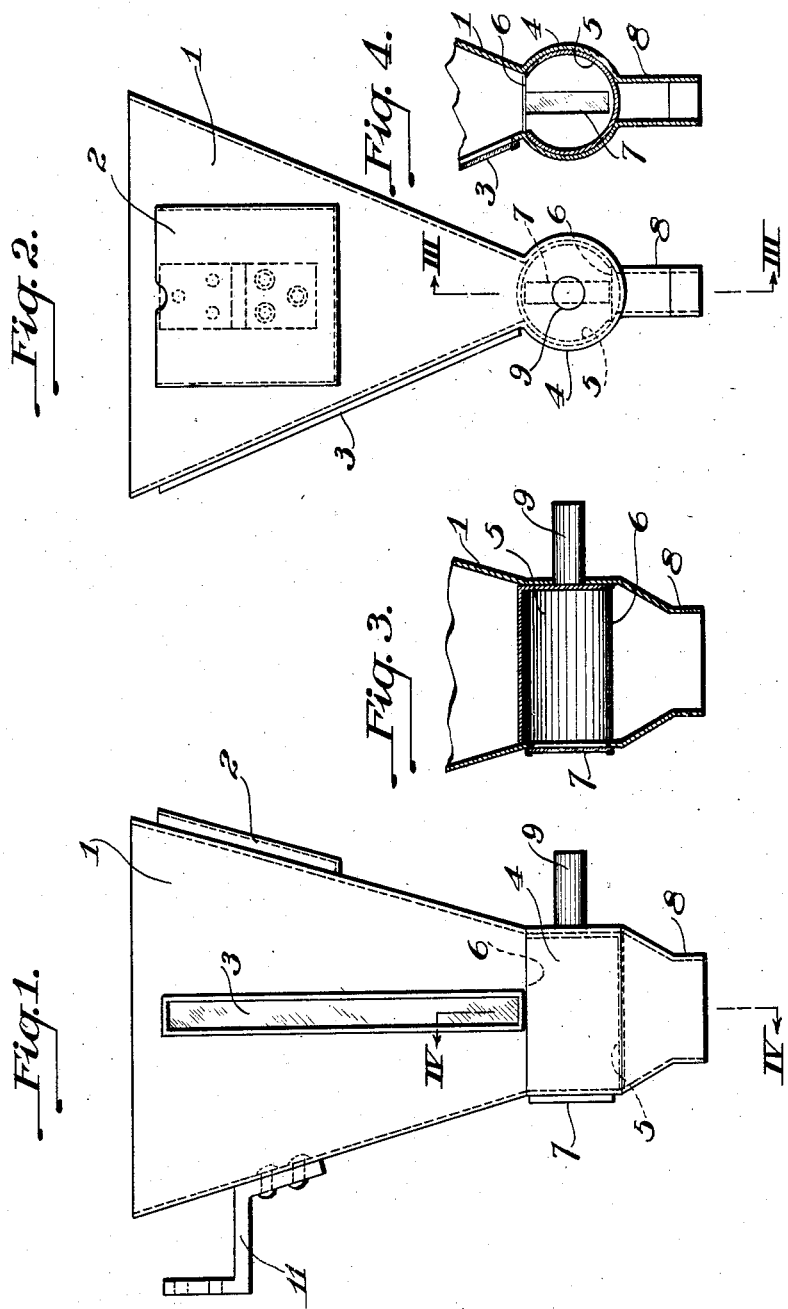

1,643,828

UNITED STATES PATENT OFFICE.

JAMES P. YOUNG, OF PITTSBURGH, PENNSYLVANIA.

SOAP-MEASURING DEVICE.

Application filed February 1, 1926. Serial No. 85,100.

This invention relates to soap dispensing devices for power-driven washing machines. More particularly it relates to a device for delivering measured charges of granular soap to power-driven washing machines in laundries, to means for recording the amount of soap that has been used, to means for delivering granular charges thereof with a minimum amount of labor, and to the particular mechanism for carrying out these results.

The objects of the invention are to provide in a simple, compact, convenient form a reservoir for retaining granular soap, for dispensing charges of suitable amount directly to laundry machines, and for observing and recording the amount of soap so dispensed, both as to each individual charge and as to successive charges.

Referring to the drawings, Fig. 1 is a side elevation of my device; Fig. 2 is an end elevation thereof; Fig. 3 is a partial section on the line III—III of Fig. 2; and Fig. 4 is a partial section on the line IV—IV of Fig. 1.

In commercial laundry work it is highly desirable to deliver the correct amount of soap to each charge of a washing machine, and it is also desirable to be able conveniently to keep a record of the amount of soap that is used in washing a certain quantity of clothes, or in a certain time, etc. It is desirable to have the soap dispensing device out of the way of the operators and clear of the machinery, but in such position that soap may be quickly delivered to the washing machine, and in such form that it may be readily worked up into suds in the machine.

To meet these and other requirements of the trade I have provided a device comprising a hopper 1 having mounted thereon a card holding flap 2, and inserted in its side a glass 3 by means of which the amount of soap in the hopper may be readily observed by an operator standing in front of the machine. The sides of the hopper converge downwardly, terminating in a horizontally positioned drum portion 4, which encloses a rotatably mounted cylindrical measuring member 5, having a longitudinal opening 6 intermediate its ends, the metal at the ends forming bearing bands extending completely around the member 5. Mounted in one of the end walls of the cylinder 5 is an observation glass 7, through which an operator may observe the contents of the rotatable cylinder 5. Beneath the cylinder 5 the walls of the hopper extend downward forming a restricted spout portion 8. To the end of the cylinder 5 opposite that in which is positioned the glass 7 there is attached a knurled handle or extension 9, loosely journaled in the wall of the end of the drum 4. By engaging the handle 9 and rotating it the measuring cylinder 5 may be turned completely around within the drum 4, which in effect forms a bearing therefor.

The operation of the device is as follows:

The hopper 1 is attached by any suitable means, as for example a bracket 11, in position above a laundry machine and so that soap discharged through the spout 8 will fall directly into the washing machine. The hopper 1 is then filled with granular soap. As the soap is used up the operator can tell when he is approaching the end of the charge by observation through the glass 3, in obvious manner. For the convenience of the operator record cards may be retained in the compartment formed by the plate 2, these cards being used for indicating the pounds of clothes washed with the pounds of soap used, or any desired data.

When a charge of clothes is placed in the machine for washing, the operator turns by means of the handle 9 the cylinder 5 to the position shown in Fig. 4. The granular soap then runs by gravity through the opening 6 until the cylinder 5 is filled. Thereupon the operator turns the handle 9, the opening 6 then moving around from the top of the cylinder as shown in Fig. 4, to the bottom as shown in Fig. 3, whereupon the granular soap is discharged through the spout 8 into the machine where the clothes and hot water are held.

It will be understood that the cylinder 5 is normally of such size that it contains the required amount of soap for the use of a single machine full of clothes. However, if for example a half charge of the cylinder is desired, the handle 9 can be turned until only a portion of the opening 6 is exposed, and by observing through the glass 7 the operator can shut off the flow of soap by reversing the movement of the cylinder, when his observation shows that enough has been delivered.

The whole device is simple, sanitary, cheap to manufacture, will not get out of order, may be positioned in any convenient place above the laundry tube, and has been found in actual use to be very efficient. Particularly, it results in economy in the use of soap, since the operator does not have to guess at the amount required, and it is normally delivered in successive charges in measured amounts, it being necessary for the operator to actually produce a delivery of each successive charge by movement of his hand.

I claim:

A device for dispensing granular soap to laundry machines, comprising a hopper having downwardly converging walls, a transparent member fitted into the wall of the hopper for permitting observation of the contents, a circular shell member fitted to the lower end of the hopper and having upper and lower openings therethrough, a delivery spout leading from the circular shell member and adapted to deliver soap passing therethrough to the laundry machine, a hollow cylindrical member mounted in the said shell having both ends closed and a single longitudinal opening therein, a transparent member fitted into one end of the inner cylindrical member, a handle attached to the other end of the inner cylindrical member, the said shell surrounding the opposite segmental portions of the cylindrical member, the opening in the inner cylindrical member being of substantially the same size as the openings from the hopper into the shell and from the said shell into the delivery spout.

In testimony whereof, I sign my name.

JAMES P. YOUNG.